United States Patent
Hammons et al.

[11] Patent Number: 5,928,672
[45] Date of Patent: Jul. 27, 1999

[54] POLYBORATE COMPOSITION

[76] Inventors: Barry D. Hammons, 1262 Cotton Grove Rd., Jackson, Tenn. 38305; Lawrence D. Ross, 16 St. Francis County Rd. 308, Forrest City, Ark. 72335

[21] Appl. No.: 08/622,991

[22] Filed: Mar. 28, 1996

[51] Int. Cl.⁶ .......................... A01N 55/08; A01N 59/14; C05C 11/00; C05C 9/00

[52] U.S. Cl. .......................... 424/660; 424/657; 424/658; 424/659; 514/64; 514/237.8; 514/255; 71/11; 71/27; 71/31; 71/54; 71/63; 71/64.1; 504/193

[58] Field of Search .................... 71/27, 31, 54, 71/DIG. 1, DIG. 2, 11, 63, 64.1; 424/657–660; 514/64, 237.8, 255; 504/193

[56] References Cited

U.S. PATENT DOCUMENTS

| | | | |
|---|---|---|---|
| 2,492,562 | 12/1949 | Fawcett | 260/399 |
| 4,007,029 | 2/1977 | Kenton | 71/11 |
| 4,119,552 | 10/1978 | Davis et al. | 252/49.6 |
| 4,155,739 | 5/1979 | Downer et al. | 71/27 |
| 4,332,609 | 6/1982 | Ott | 71/27 |
| 4,461,721 | 7/1984 | Goettsche et al. | 252/607 |
| 4,572,733 | 2/1986 | Howard | 71/64.08 |
| 4,844,725 | 7/1989 | Malouf et al. | 71/3 |
| 4,908,362 | 3/1990 | Goettsche et al. | 514/231.2 |

FOREIGN PATENT DOCUMENTS

| | | |
|---|---|---|
| 842649 | 6/1975 | Belgium . |
| 1082230 | 7/1980 | Canada . |
| 0046380 | 8/1980 | European Pat. Off. . |
| 72 534 | 2/1983 | European Pat. Off. . |
| 1522416 | 8/1978 | United Kingdom . |

*Primary Examiner*—John Pak
*Attorney, Agent, or Firm*—Suelthaus & Walsh P.C.

[57] ABSTRACT

A polyborate composition suitable for use in agricultural fertilizer preparations is provided. The polyborate is formed as the reaction product of a boric acid compound with one or more cyclic amines in aqueous solution. The resulting polyborate is extremely temperature stable and does not crystallize during preparation, storage or use. A method of preparation necessary to result in a non-crystallizing polyborate is also provided.

10 Claims, No Drawings

POLYBORATE COMPOSITION

BACKGROUND OF THE INVENTION

The present invention relates in general to a polyborate composition and pertains more particularly to a polyborate fertilizer composition which is the reaction product of boric acid with one or more cyclic amine compounds, as well as the method of producing the polyborate composition. The polyborate compositions of this invention are an improvement over conventional polyborate fertilizers.

Boron is an essential nutrient which is commonly added to fertilizer preparations. Liquid boron compositions were traditionally the product of sodium tetraborate dissolved in water. Due to the low solubility of sodium borates, solutions in the range of 3% boron were typical.

In order to produce an aqueous solution having a higher boron percentage, attempts were made to utilize water soluble polyborate compounds. For example, Ott, U.S. Pat. No. 4,332,609 claims the use of a known polyborate compound for use in fertilizer compositions.

The polyborate compound, first disclosed by Anger, Canadian Patent 1082230, is prepared by reacting simple alkanolamines or aliphatic polyamines with boric acid.

A major disadvantage of the Anger/Ott polyborates is that the product easily crystallizes, rendering the polyborate or a fertilizer composition into which the polyborate is incorporated useless.

Another disadvantage of the Anger/Ott polyborates is an inability to mix the polyborates with other necessary fertilizer nutrients and/or elements. An example of such a nutrient is calcium, which is a required nutrient for certain crops including cotton. Calcium containing compositions do not mix satisfactorily with the Anger/Ott polyborates. This results in the need to apply the boron and calcium compositions separately, greatly increasing costs.

A commercially available polyborate formulation, Tracite® is manufactured under a process licensed by United Agricultural Products, Inc. (UAP), the owner of the Ott patent. The product specification sheet for Tracite® specifically states that this borate preparation is not to be mixed with any product containing calcium.

SUMMARY OF THE INVENTION

Accordingly, it is the object of the present invention to produce an aqueous polyborate solution of a pH from 7–8 which is suitable for use in fertilizer preparations.

Another object of the present invention is to produce an aqueous polyborate solution which does not form crystals in solution during preparation of the polyborate.

Still another object of the present invention is to produce a polyborate solution which is temperature stable to prevent crystallization during storage and application of the polyborate solutions.

A further object of the present invention is to produce an aqueous polyborate solution which is easily manufactured and can be produced from a commercially available mixture of heterocyclic amines.

Still a further object of the present invention is to produce an aqueous polyborate solution which is compatible with other elements and nutrients commonly present in fertilizer preparations.

Another object of the present invention is to produce an aqueous polyborate solution which mixes easily with calcium containing fertilizer preparations to allow both the borate and calcium nutrients to be applied simultaneously.

Still another object of the present invention is to provide a method of producing the polyborate of the present invention. Yet another object of the invention is to provide a polyborate composition containing about 8 to 12 weight percent elemental boron, which polyborate composition comprises a final reaction product of a boric acid compound and a plurality of cyclic amines in water, wherein at least one of the cyclic amines is morpholineaminodiglycol, whereby the polyborate composition is a temperature stable aqueous liquid of pH from about 7 to about 8.

To accomplish the foregoing and other objects of this invention there is provided an aqueous polyborate composition which does not crystallize during preparation, storage, or use. Further, the polyborate compositions disclosed are readily mixable with fertilizer compositions containing calcium compounds. It has been discovered that polyborate compositions formed from the preferred amines and produced by the method described below meet all of the objects of the present invention.

The polyborate compositions of the present invention are the product of the reaction of boric acid compounds with one or more cyclic amines in water. The boric acid compound can be supplied by orthoboric acid $H_3BO_3$, metaboric acid $HBO_2$, pyroboric acid $H_2B_4O_9$, boric oxide $B_2O_3$ or any mixture containing one or more of these forms of boric acid.

The presently preferred cyclic amines of the present invention are N-(2-aminoethyl)piperazine, morpholineaminodiglycol, and a mixture of substituted morpholine compounds. It has been discovered that use of this group of amines leads to the superior product disclosed and claimed herein.

The polyborate composition is produced as follows. A quantity of water necessary to result in the desired percentage of water in the final solution is added to a reaction vessel. A portion, preferably about one half of the total quantity of amine to be reacted is then thoroughly mixed with the water.

The boric acid compound is then added to the amine solution and agitated until completely dissolved. The reaction temperature is maintained at or below 80° F. at all times.

The remaining portion of the amine is then added to the reaction vessel, and the solution is mixed for at least two hours until the reaction is complete.

These and other objects and features of the present invention will be better understood and appreciated from the following detailed description of the following embodiments, selected for the purposes of illustration.

DETAILED DESCRIPTION

The presently preferred amines are heterocyclic;

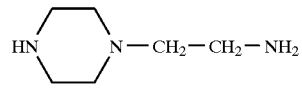

N-(2-aminoethyl)piperazine,

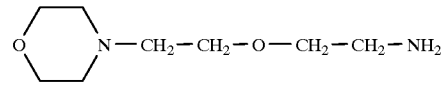

morpholineaminodiglycol, and a commercially available mixture of substituted morpholine compounds, 800-L available from J. B. Crawford Chemical Company, Crawfordsville, Ark. The 800-L mixture yields a product with the same superior properties at a lower cost.

The preferred source of boron is 17.5% boron technical grade manufactured by U.S. Borax.

The compositions of this invention are prepared by mixing the components in a reaction vessel in the order specified. A first portion of the amine, preferable about one half of the total amine is well mixed with water at an agitation speed low enough to prevent forming a vortex or shearing action that will result in foaming. Use of a low shear circulating pump is presently preferred.

The boric acid compound is then added through a large sieve to prevent lumping. This mixture is agitated until the boric acid compound is completely dissolved.

While maintaining a temperature equal to or less than about 80° F., the remaining amine is added. The temperature may be maintained by the use of a temperature controlled reaction vessel, or by adding the amine slowly enough to prevent a rise in temperature to above 80° F. The reaction mixture is then agitated for at least two hours.

It has been discovered that the addition of the amine in two portions, one before the addition of the boric acid compound and one after, as well as the maintenance of a temperature not to exceed 80° is critical to the formation of the superior product of the present invention.

In a preferred composition of the present invention, the product contains about 40–60% boric acid compound and 10–40% amine, the remaining percentage being water.

In a most preferred composition of the present invention, the product contains about 53.5% boric acid compound, 25% amine, and 21.5% water.

The following examples are illustrative of the preparation of the preferred embodiments of the present invention. The correspondence between the foregoing composition expressed in percentages (i.e. 53.5% boric acid compound, 25% amine, 21.5% water) and the following composition expressed in grams (i.e., 53.5 g boric acid compound, 25 g amine, 21.5 g water for a 100 g composition) show that all percentages are weight percentages.

EXAMPLES 1–3

A reaction vessel with an agitation device, preferably a low shear circulating pump was utilized. A temperature not to exceed 80° F. was maintained throughout preparation of the polyborate composition. One half of the total amount of amine, 12.5 g, was added to 21.5 g water and mixed at an agitation speed low enough to mix without foaming. Boric acid, 53.5 g, was then added and the resulting mixture stirred until the boric acid was completely dissolved. The remaining amine, 12.5 g, was then added and the mixture stirred for at least two hours.

| Example | Amine |
|---|---|
| 1 | N-(2-aminoethyl) piperazine |
| 2 | Morpholineaminodiglycol |
| 3 | 800-L |

In use, the polyborate composition of the present invention may be applied as prepared as a fertilizer in any manner known to those skilled in the art. As the improved polyborates of the present invention do not crystallize as do the polyborates disclosed in the prior art, no special storage measures are necessary. Further, the non-crystalline properties prevent problems during storage, such as crystal formation within a storage vessel or during application, such as clogging of sprayers or other applicators.

In addition, the improved polyborate composition may be added to another fertilizer preparation. Illustrative is the compatibility of the improved polyborate with calcium preparations. Calcium is a necessary nutrient for crops such as cotton. Unlike prior art polyborate compositions, the improved polyborate of the present invention mixes easily with calcium preparations. This allows simultaneous application of the boron containing polyborate and a calcium preparation, reducing application time by decreasing by half the number of passes required during field application and, thereby, reducing the overall costs.

Lignin sulfonate chelates of calcium and calcium glucoheptonates are the preferred calcium sources for cotton and other row crops. It has been discovered that the improved polyborate of the present invention is compatible with these calcium sources.

The UAP polyborate composition is not compatible with these calcium sources. Mixing the UAP polyborate with these compounds results in the calcium and/or boron crystallizing out of solution.

While both the improved polyborate composition of the present invention and the UAP polyborate composition can be mixed satisfactorily with Calcium EDTA, this chelate is presently three times more expensive than the calcium compounds listed above and, more importantly, is not the preferred source of calcium for crops such as cotton.

From the foregoing description those skilled in the art will appreciate that all of the objects of the present invention are realized. An aqueous polyborate solution of a pH from 7–8 which is suitable for use in fertilizer preparations is provided.

The aqueous polyborate solution does not form crystals in solution during preparation of the polyborate, and is temperature stable to prevent crystallization during storage and application.

An aqueous polyborate solution of the present invention is easily manufactured and can be produced from a commercially available mixture of heterocyclic amines.

In addition, the improved aqueous polyborate solution is compatible with other elements and nutrients commonly present in fertilizer preparations. Specifically, the improved polyborate solution mixes easily with calcium containing fertilizer preparations to allow both the borate and calcium nutrients to be applied simultaneously.

Finally, a method of producing the improved polyborate of the present invention is provided.

Having described the invention in detail, those skilled in the art will appreciate that modifications may be made of the invention without departing from its spirit. Therefore, it is not intended that the scope of the invention be limited to the specific embodiments described. Rather, it is intended that the scope of the invention be determined by the appended claims and their equivalents.

What is claimed is:

1. A polyborate composition containing about 8 to 12 weight percent elemental boron, which polyborate composition comprises a final reaction product of a boric acid compound a plurality of cyclic amines in water, wherein at least one of the cyclic amines is morpholineaminodiglycol, whereby the polyborate composition is a temperature stable aqueous liquid of pH from about 7 to about 8.

2. The polyborate composition of claim 1, wherein the final reaction product is obtained from a reaction mixture comprising about 40–60 weight percent of the boric acid compound, 10–40 weight percent of the cyclic amines, and water.

3. The polyborate composition of claim 1, wherein the final reaction product is obtained from a reaction mixture comprising about 50–55 weight percent of the boric acid compound, 10–40 weight percent of the cyclic amines, and water.

4. The polyborate composition of claim 1, wherein the final reaction product is obtained from a reaction mixture comprising about 53.5 weight percent of the boric acid compound, 25 weight percent of the cyclic amines, and 21.5 weight percent of water.

5. A polyborate composition containing about 8 to 12 weight percent elemental boron, which polyborate composition comprises a final reaction product of a boric acid compound and morpholineaminodiglycol in water, whereby the polyborate composition is a temperature stable aqueous liquid of pH from about 7 to about 8.

6. The polyborate composition of claim 5, wherein the final reaction product is obtained from a reaction mixture comprising about 40–60 weight percent of the boric acid compound, 10–40 weight percent of the morpholineaminodiglycol, and water.

7. The polyborate composition of claim 5, wherein the final reaction product is obtained from a reaction mixture comprising about 50–55 weight percent of the boric acid compound, 10–40 weight percent of the morpholineaminodiglycol, and water.

8. A polyborate composition containing about 8 to 12 weight percent elemental boron, which polyborate composition comprises a final reaction product of a boric acid compound and morpholineaminodiglycol in water, wherein the final reaction product is obtained from a reaction mixture in which the boric acid compound comprises about 53.5 weight percent, the morpholineaminodiglycol about 25 weight percent, and water about 21.5 weight percent, whereby the polyborate composition is a temperature stable aqueous liquid of pH from about 7 to about 8.

9. A fertilizer composition comprising the polyborate composition according to claims 1, 5 or 8 in combination with another plant nutrient composition.

10. The fertilizer composition of claim 9 wherein the plant nutrient composition is a calcium containing composition.

* * * * *